(12) United States Patent  
Shinohara et al.

(10) Patent No.: US 9,117,594 B2
(45) Date of Patent: Aug. 25, 2015

(54) PHOTOELECTRIC CONVERSION DEVICE AND ELECTRONIC EQUIPMENT

(71) Applicants: SEIKO EPSON CORPORATION, Tokyo (JP); SHINSHU UNIVERSITY, Matsumoto-shi, Nagano (JP)

(72) Inventors: Yuji Shinohara, Kofu (JP); Yoshiharu Ajiki, Fujimi-cho (JP); Katsuya Teshima, Nagano (JP); Shuji Oishi, Chikuma (JP)

(73) Assignees: SEIKO EPSON CORPORATION, Tokyo (JP); SHINSHU UNIVERSITY, Matsumoto (JP)

( * ) Notice: Subject to any disclaimer, the term of this patent is extended or adjusted under 35 U.S.C. 154(b) by 39 days.

(21) Appl. No.: 14/162,394

(22) Filed: Jan. 23, 2014

(65) Prior Publication Data

US 2014/0137944 A1    May 22, 2014

Related U.S. Application Data

(63) Continuation of application No. 12/007,960, filed on Jan. 17, 2008, now Pat. No. 8,669,625.

(30) Foreign Application Priority Data

Jan. 17, 2007  (JP) .................................. 2007-008574

(51) Int. Cl.
  *H01L 27/142*  (2014.01)
  *H01G 9/20*  (2006.01)

(52) U.S. Cl.
  CPC ........... *H01G 9/2031* (2013.01); *H01G 9/2027* (2013.01); *H01G 9/2036* (2013.01); *H01G 9/2059* (2013.01); *Y02E 10/542* (2013.01)

(58) Field of Classification Search
  None
  See application file for complete search history.

(56) References Cited

U.S. PATENT DOCUMENTS 6,350,946 B1 *  2/2002  Miyake et al. ................ 136/252
7,476,607 B2    1/2009  Yamada et al.
(Continued)

FOREIGN PATENT DOCUMENTS

JP       B-2664194       10/1997
JP     A-2006-185911      7/2006
(Continued)

OTHER PUBLICATIONS

Gersten et al.; *The Physics and Chemistry of Materials*; 2001; John Wiley and Sons, Inc.; U.S.A.
(Continued)

*Primary Examiner* — Fei Fei Yeung Lopez
(74) *Attorney, Agent, or Firm* — Oliff PLC

(57) ABSTRACT

A photoelectric conversion device provided with an electron transport layer having an excellent electron transport ability and having an excellent photoelectric conversion efficiency, and electronic equipment provided with such a photoelectric conversion device and having a high reliability are provided. A solar cell, to which the photoelectric conversion device is applied, has a first electrode provided on a substrate, a second electrode arranged opposite to the first electrode and retained on a facing substrate, an electron transport layer provided between these electrodes and positioned on the side of the first electrode, a dye layer being in contact with the electron transport layer, and an electrolyte layer provided between the electron transport layer and the second electrode and being in contact with the dye layer. The electron transport layer includes particles of sodium trititanate.

8 Claims, 6 Drawing Sheets

(56) References Cited

U.S. PATENT DOCUMENTS

| | | |
|---|---|---|
| 2001/0051262 A1 | 12/2001 | Sugizaki et al. |
| 2003/0140959 A1 | 7/2003 | Gaudiana et al. |
| 2003/0150485 A1 | 8/2003 | Koyanagi et al. |
| 2004/0099919 A1 | 5/2004 | Schatz et al. |
| 2004/0265587 A1 | 12/2004 | Koyanagi et al. |
| 2005/0178431 A1 | 8/2005 | Yang et al. |
| 2006/0243321 A1 | 11/2006 | Yamada et al. |
| 2010/0255285 A1 | 10/2010 | Tian |

FOREIGN PATENT DOCUMENTS

| | | |
|---|---|---|
| JP | A-2008-171621 | 7/2008 |
| WO | WO 2005/057716 A1 | 6/2005 |

OTHER PUBLICATIONS

Keller et al.; *Dictionary of Engineering Materials*; 2004; John Wiley and Sons, Inc.; U.S.A.

* cited by examiner

PHOTOELECTRIC CONVERSION DEVICE AND ELECTRONIC EQUIPMENT

CROSS-REFERENCE TO RELATED APPLICATION

This application is a continuation of application Ser. No. 12/007,960, filed on Jan. 17, 2008, which claims a priority to Japanese Patent Application No. 2007-008574 filed on Jan. 17, 2007, each application of which is hereby expressly incorporated by reference herein in its entirety.

BACKGROUND

1. Technical Field

The present invention relates to a photoelectric conversion device and electronic equipment provided with the photoelectric conversion device.

2. Related Art

From the past, great attention has been paid to solar cells (photoelectric conversion device) employing silicon as a power source which is harmless to the environment. As for these solar cells employing silicon, a monocrystalline silicon type solar cell is known, which is used in artificial satellites or the like.

In addition, as solar cells for practical applications, there are known a solar cell employing polycrystalline silicon and a solar cell employing amorphous silicon. These solar cells have already been practically used in industrial and household applications.

However, since these solar cells employing silicon require high manufacturing cost and a great deal of energy in manufacturing thereof, these solar cells have not yet reached to a level that can be practically used as an energy-saving power source.

In view of the problem described above, a dye-sensitized solar cell is proposed and developed as a solar cell of the next generation that can be replaced with the above solar cell employing silicon. The dye-sensitized solar cell has advantages that its manufacturing cost is low and it can be manufactured with relatively small energy.

The dye-sensitized solar cell has a structure that includes a transparent electrode, a facing electrode arranged opposite to the transparent electrode, and a semiconductor layer (electron transport layer) carrying a dye and provided between the electrodes.

When the dye-sensitized solar cell receives light, electrons and holes are generated in the dye. And, the electrons and holes are separated with each other on the side of the transparent electrode and the side of the facing electrode, respectively. As a result, a potential difference is created between the transparent electrode and the facing electrode.

For example, Japanese Patent No. 2,664,194 discloses a dye-sensitized solar cell having a semiconductor layer (electron transport layer) constituted of a polycrystalline material of titanium oxide. A dye is adsorbed or carried on surfaces of particles of the polycrystalline material of titanium oxide, and electrons generated in the dye move to an electrode through the particles.

However, there is a problem in that the polycrystalline material of titanium oxide do not have a sufficient electron transport ability which transfers electrons from the dye to the electrode.

SUMMARY

It is an object of the present invention to provide a photoelectric conversion device provided with an electron transport layer having an excellent electron transport ability and having an excellent photoelectric conversion efficiency, and electronic equipment provided with such a photoelectric conversion device and having a high reliability.

The object is achieved by the present invention described below. In a first aspect of the present invention, there is provided a photoelectric conversion device, which comprises a first electrode, a second electrode, an electron transport layer provided between the first electrode and the second electrode, and a dye layer provided between the first electrode and the second electrode, wherein the electron transport layer is constituted of a monocrystalline material of multiple oxide as a main component thereof.

This makes it possible to obtain a photoelectric conversion device provided with an electron transport layer having an excellent electron transport ability and having an excellent photoelectric conversion efficiency.

In the present invention, it is preferred that the second electrode is arranged opposite to the first electrode and the dye layer is provided in contact with the electron transport layer, and the photoelectric conversion device further comprises an electrolyte layer provided in contact with the dye layer between the electron transport layer and the second electrode.

This makes it possible to obtain a photoelectric conversion device provided with an electron transport layer having an more excellent electron transport ability and having an more excellent photoelectric conversion efficiency.

In the present invention, it is preferred that a crystal structure of the monocrystalline material of multiple oxide has a layer structure, a tunnel structure or a perovskite structure.

The monocrystalline material of multiple oxide having such a crystal structure can carry especially easily the dye at the inside and/or on the surface thereof. Therefore, the total amount of the dye carried on the electron transport layer becomes large. As a result, the photoelectric conversion efficiency of the photoelectric conversion device can be further improved.

In the present invention, it is preferred that the multiple oxide contains at least one metal element selected from the group comprising niobium, titanium, zinc, tin, vanadium, indium, tungsten, tantalum, zirconium, molybdenum and manganese.

All of these metal elements have a similar physical and chemical property, and form chemically stable multiple oxide together with alkaline metal atom (alkaline metal element) and the like. And this multiple oxide is preferably used as a constituent material of the electron transport layer having a function of transporting electrons.

In the present invention, it is preferred that the multiple oxide is potassium niobate or sodium titanate.

The multiple oxide having such a composition is particularly chemically stable, and has an excellent electron transport ability. Therefore, such a multiple oxide is particularly preferably used as the constituent material of the electron transport layer.

In the present invention, it is preferred that the potassium niobate is potassium hexaniobate ($K_4Nb_6O_{17}$) or potassium octaniobate ($K_2Nb_8O_{21}$).

A crystal structure of a monocrystalline material of the potassium hexaniobate has a layer structure, and a whole shape thereof is in the form of a flake. As a result, the potassium hexaniobate can carry a great amount of the dye between adjacent layers contained in the crystal structure thereof and/or on a surface of the crystal structure thereof.

Further, a crystal structure of a monocrystalline material of the potassium octaniobate has a tunnel structure, and a whole shape thereof is in the form of a whisker. Since the potassium octaniobate has distribution of a surface charge on an inner surface of the tunnel and/or a surface of the crystal structure (outer surface of the tunnel) due to a composition thereof and the crystal structure thereof, the potassium octaniobate can carry a great amount of the dye on the inner surface of the tunnel and/or the surface of the crystal structure thereof.

Furthermore, each of these monocrystalline materials has advantages that its recovery from poisoning due to a catalytic poison is carried out early and it has a long life, as well as it has a high light-harvesting efficiency. Therefore, the photoelectric conversion device provided with the electron transport layer constituted of such monocrystalline materials can have a long life and a high photoelectric conversion efficiency.

In the present invention, it is preferred that the sodium titanate is sodium trititanate ($Na_2Ti_3O_7$) or sodium hexatitanate ($Na_2Ti_6O_{13}$).

A crystal structure of a monocrystalline material of the sodium trititanate has a layer structure, and a whole shape thereof is in the form of a flake. As a result, the sodium trititanate can carry a great amount of the dye between adjacent layers contained in the crystal structure thereof and/or on a surface of the crystal structure thereof.

Further, a crystal structure of a monocrystalline material of the sodium hexatitanate has a tunnel structure, and a whole shape thereof is in the form of a whisker. Since the sodium hexatitanate has distribution of a surface charge on an inner surface of the tunnel and/or a surface of the crystal structure (outer surface of the tunnel) due to a composition thereof and the crystal structure thereof, the sodium hexatitanate can carry a great amount of the dye on the inner surface of the tunnel and/or the surface of the crystal structure thereof.

Furthermore, each of these monocrystalline materials has advantages that its recovery from poisoning due to a catalytic poison is carried out early and it has a long life, as well as it has a high light-harvesting efficiency. Therefore, the photoelectric conversion device provided with the electron transport layer constituted of such a monocrystalline material can have a long life and a high photoelectric conversion efficiency.

In the present invention, it is preferred that the electron transport layer is constituted of an aggregate in which particles of the monocrystalline material of multiple oxide are aggregated.

This makes it possible to form the electron transport layer without using a large size monocrystalline material which is difficult to produce. As a result, the electron transport layer can be formed easily and economically.

Further, in the case where the electron transport layer is constituted of the aggregate of the particles of the monocrystalline material, since a stress which would be generated in the electron transport layer can be dispersed, the electron transport layer can have an improved durability against the stress.

In the present invention, it is preferred that an average particle size of the particles of the monocrystalline material of multiple oxide is in the range of 0.01 to 150 μm.

By setting the particle size of the particles of the monocrystalline material of multiple oxide to a value within the above range, each of the particles can have an adequate particle size. As a result, the electron transport layer, which is constituted of the aggregate of the particles each having such an adequate particle size, can behave like an electron transport layer constituted of a single bulk-like monocrystalline material in transportation of electrons.

Further, since each of the particles has an adequate particle size, by dispersing the particles into a dispersion medium, a dispersion liquid in which the particles are dispersed into the dispersion medium uniformly can be prepared. As a result, use of such a dispersion liquid makes it possible to form the electron transport layer using an coating method efficiently. Further, the particles can distribute uniformly in the thus formed electron transport layer.

For these reasons, it is possible to obtain an electron transport layer constituted of the monocrystalline material of multiple oxide easily and economically, while maintaining properties of the monocrystalline material itself.

In the present invention, it is preferred that an average thickness of the electron transport layer is in the range of 1 to 300 μm.

By setting the average thickness of the electron transport layer to a value within the above range, the electron transport layer can carry an adequate amount of the dye.

In the present invention, it is preferred that the first electrode is constituted of a metal oxide material as a main component thereof.

Since the first electrode constituted of the metal oxide material has excellent translucency, the photoelectric conversion device provided with such a first electrode can have a high photoelectric conversion efficiency.

In the present invention, it is preferred that at least a part of the dye layer is penetrated into the monocrystalline material of multiple oxide.

According to this structure, it is possible to make a physical distance between atoms (ions) constituting the multiple oxide and molecules of the dye close. As a result, electrons can be transferred from the dye to the electron transport layer more smoothly. Namely, the electron transport ability of the electron transport layer can be improved.

In a second aspect of the present invention, there is provided electronic equipment, which is provided with the above photoelectric conversion device.

This makes it possible to obtain electronic equipment having a high reliability.

BRIEF DESCRIPTION OF THE DRAWINGS

FIG. 4 (FIGS. 4(d) to 4(f)) is a schematic illustration for explaining the manufacturing method of the solar cell shown in FIG. 1, wherein

DESCRIPTION OF EXEMPLARY EMBODIMENTS

In the following, the photoelectric conversion device and the electronic equipment of the present invention will be described in detail with reference to preferred embodiments shown in the accompanying drawings.

In this regard, it is to be noted that the following description will be made based on a solar cell to which the photoelectric conversion device according to the present invention is applied.

Figure 1:
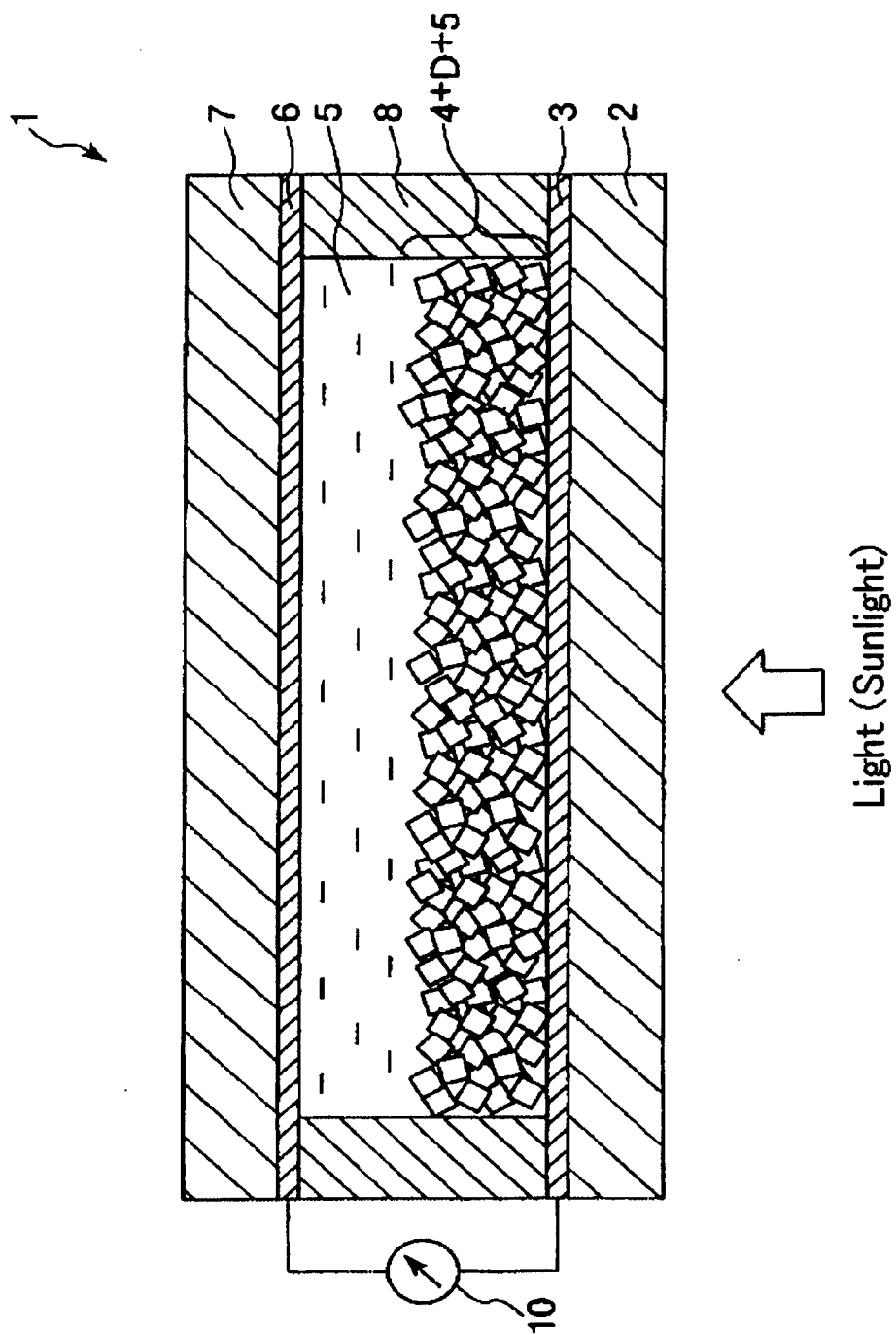
FIG. 1 is a cross sectional view which shows an embodiment of a case that the photoelectric conversion device of the present invention is applied to a dye-sensitized solar cell.
Figure 2:
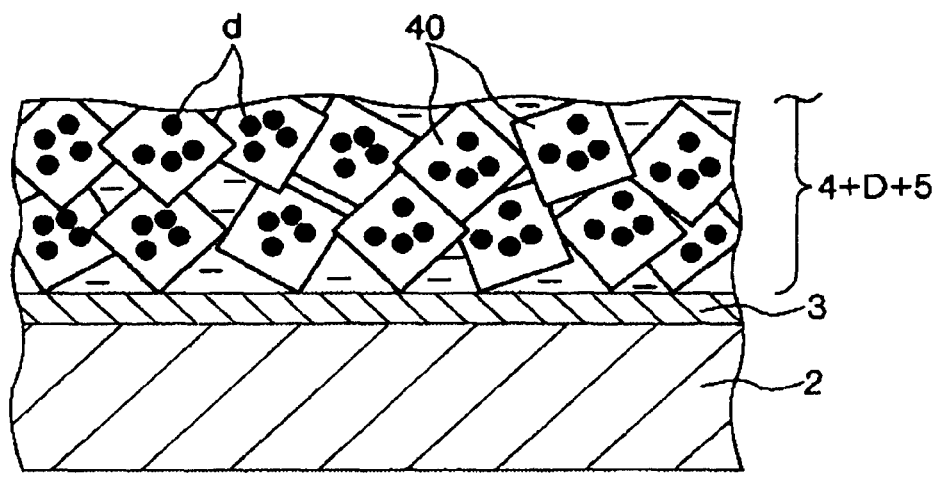
FIG. 2 is an enlarged cross sectional view which schematically shows a part of the solar cell shown in FIG. 1 along with its thickness direction.

FIG. 1 is a cross sectional view which shows an embodiment of a case that the photoelectric conversion device of the present invention is applied to a dye-sensitized solar cell. FIG. 2 is an enlarged cross sectional view which schematically shows a part of the solar cell shown in FIG. 1 along with its thickness direction.

Figure 3A:
FIG. 3 (FIGS. 3(a) to 3(c)) is a schematic illustration for explaining a manufacturing method of the solar cell shown in FIG. 1.
Figure 3B:
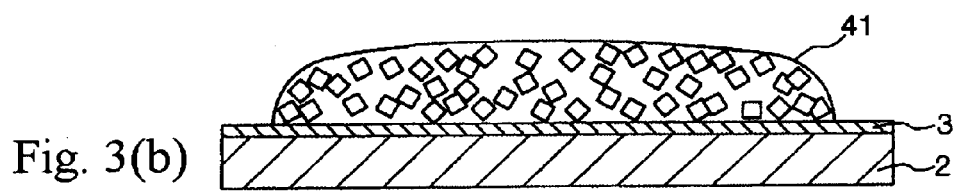
Figure 3C:
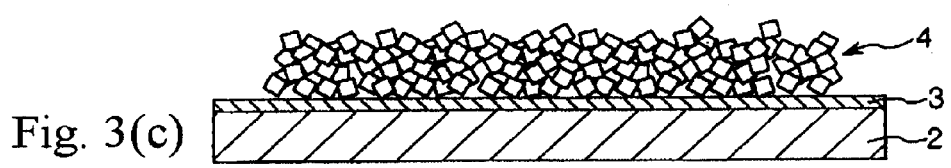
Figure 4D:
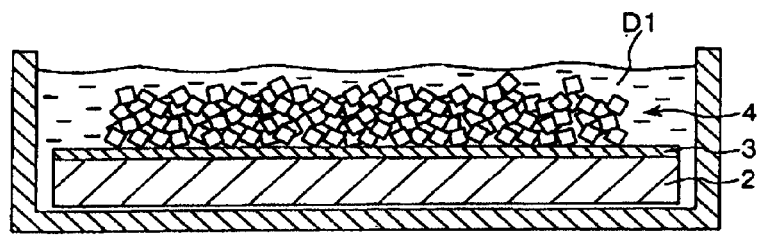
FIG. 4(d) is continued from FIG. 3(c).

FIGS. 3 and 4 are schematic illustrations for explaining a manufacturing method of the solar cell shown in FIG. 1. In this regard, it is to be noted that FIG. 4(d) is continued from FIG. 3(c). In the following description, the upper side in FIGS. 1 to 4 will be referred to as "upper" and the lower side thereof will be referred to as "lower" for convenience of explanation.

A solar cell 1 shown in FIG. 1 has a first electrode 3 provided on a substrate 2, a second electrode 6 arranged opposite to the first electrode 3 and retained on a facing substrate 7, an electron transport layer 4 provided between these electrodes 3 and 6 and positioned on the side of the first electrode 3, a dye layer D being in contact with the electron transport layer 4, and an electrolyte layer 5 provided between the electron transport layer 4 and the second electrode 6 and being in contact with the dye layer D.

Further, a partition 8 is provided between the electrodes 3 and 6, and along circumferences of the electrodes 3 and 6. The electron transport layer 4, the dye layer D and the electrolyte layer 5 are arranged inside a space which is defined by the electrodes 3 and 6, and the partition 8.

In the following, a structure of each part will be described.

In this embodiment, the substrate 2 and the facing substrate 7 are provided for supporting the first electrode 3, the electron transport layer 4, the dye layer D and the second electrode 6, and formed from a plate-like member, respectively.

As shown in FIG. 1, the solar cell 1 of this embodiment is used by receiving light, for example, sunlight (hereinafter, referred to simply as "light") from the side of the substrate 2 and the first electrode 3 described below. That is, the solar cell 1 is illuminated with the light entered from the side of the substrate 2 and the first electrode 3.

For this reason, it is preferred that the substrate 2 and the electrode 3 are respectively substantially transparent. By so choosing, light can be made to arrive at the dye layer D described below with a high efficiency. What is meant here by the term of the substantially transparent is that it may be either one of achromatically transparent, chromatically transparent or semitransparent.

Examples of the constituent material of each of the substrate 2 and the facing substrate 7 include a glass material, a ceramic material, a resin material, a metallic material such as aluminum and the like.

Among these materials, the resin material is particularly preferred for the constituent material of each of the substrate 2 and the facing substrate 7. Since the resin material has a high plasticity, by forming the substrate 2 and the facing substrate 7 from the resin material, a flexibility of the solar cell 1 can be improved.

Further, since the resin material has light weight, by forming the substrate 2 and the facing substrate 7 from the resin material, it becomes possible to convey the solar cell 1 easily. By using such a light weight material, the solar cell 1 can be manufactured easily.

Examples of the resin material that can be used for constituting the substrate 2 and the facing substrate 7 include: polyolefins such as polyethylene (PE), polypropylene (PP) and ethylene vinyl acetate copolymer (EVAC); modified polyolefin; polyamide (e.g., nylon 6); thermoplastic polyamide; liquid crystal polymer such as aromatic polyester; polyphenylene oxide; polyphenylene sulfide (PPS); polysulfone (PSU); polycarbonate (PC); polymethyl methacrylate; polyether; polyether ether ketone; polyetherimide; polyacetal; various kinds of thermoplastic resins such as styrene-based thermoplastic resin, polyvinyl chloride-based thermoplastic resin, polyurethane-based thermoplastic resin, polyester-based thermoplastic resin (e.g., polyethylene terephthalate (PET) or polyethylene naphtalate (PEN)), polyimide-based thermoplastic resin, polybutadiene-based thermoplastic resin, transpolyisoprene-based thermoplastic resin, fluororubber-based thermoplastic resin and chlorinated polyethylene-based thermoplastic resin; a copolymer, blend or polymer alloy in which the above resin is contained as a main component thereof; and the like, and these resins can be used singly or in combination of two ore more of them.

Among these resins, polycarbonate (PC), polyethylene terephthalate (PET), polyethylene naphtalate (PEN), polyphenylene sulfide (PPS), polysulfone (PSU), polypropylene (PP) or polyimide (PI) is preferably used as the resin material.

Further, polycarbonate, polyethylene terephthalate or polyethylene naphtalate is more preferably used as the resin material. Since these resin materials have relatively excellent heat resistance and chemical resistance, by selecting such a resin material, the substrates 3 and 7 can exhibit an excellent durability against heat of a heat treatment or a solvent to be used in a liquid phase process during manufacturing the solar cell 1.

In addition, since these resin materials have high translucency, by forming the substrate 2 from such a resin material, much light can arrive at the dye layer D. As a result, the photoelectric conversion efficiency of the solar cell 1 can be improved. Furthermore, since such a resin material is inexpensive and can be easily available, a manufacturing cost of the solar cell 1 can be reduced.

An average thickness of each of the substrate 2 and the facing substrate 7 is appropriately set depending on the constituent material thereof, usage of the solar cell 1 or the like, and is not particularly limited to a specific value, but it may be set, for example, as follows.

In the case where each of the substrate 2 and the facing substrate 7 is formed of a hard material, the average thickness is in the range of about 0.1 to 1.5 mm, and more preferably in the range of about 0.3 to 1.2 mm.

On the other hand, in the case where each of the substrate 2 and the facing substrate 7 is formed of a flexible material, the average thickness is in the range of about 0.5 to 500 μm, and more preferably in the range of about 10 to 300 μm.

In this regard, it is to be noted that the facing substrate 7 may be omitted if needed.

As described above, on the substrate 2 (at the side of one surface of the substrate 2), there is provided the first electrode 3. The electrode 3 receives electrons generated in the dye layer D described below via the electron transport layer 4 and transmits them to an external circuit 10 connected thereto.

A constituent material of the first electrode 3 is not particularly limited to a specific type. Examples of the constituent material of the first electrode 3 include: metal oxide materials such as indium-tin oxide (ITO), fluorine-doped tin oxide (FTO), indium oxide ($InO_2$), and tin oxide ($SnO_2$); metal materials such as aluminum, nickel, cobalt, platinum, silver, gold, copper, molybdenum, titanium, tantalum, and alloys thereof; carbon materials such as graphite; and the like, and one kind or a combination of two or more kinds of these materials may be used.

In the case where the combination of the above materials is used, the first electrode 3 may be formed into a laminate body having a plurality of layers each constituted of different material described above.

An average thickness of the first electrode 3 is appropriately set depending on the constituent material thereof, usage of the solar cell 1 or the like, and is not particularly limited to a specific value, but it may be set, for example, as in the following.

In the case where the first electrode 3 is formed of the metal oxide material (that is, transparent conductive metal oxide material), the average thickness is in the range of about 0.05 to 5 μm, and more preferably in the range of about 0.1 to 1.5 μm.

Further, in the case where the first electrode 3 is formed of the metal material or carbon material, the average thickness is in the range of about 0.01 to 1 μm, and more preferably in the range of about 0.03 to 0.1 μm.

In this regard, it is to be noted that the first electrode 3 is not limited to the structure shown in the figure, and it may be formed into a shape which has a plurality of comb teeth. In this case, since light arrives at the dye layer D by passing the spaces between the plurality of comb teeth, the first electrode 3 need not be transparent. This choice of the shape widen selection of the constituent material of the first electrode 3 and its manufacturing method.

Further, it is possible to use a combination of such a comb-teeth-like electrode and a film-like electrode as the first electrode 3. In the case of combining these electrodes, they may be laminated with each other, for example.

On the first electrode 3, an electron transport layer 4 is provided. The electron transport layer 4 has at least a function of transporting electrons generated in the dye layer D to the first electrode 3. Such an electron transport layer 4 is constituted of a monocrystalline material of multiple oxide as a main component thereof. This multiple oxide includes metal acid oxide containing two or more of metal oxides.

In general, such a monocrystalline material of multiple oxide has a stereoscopic crystal structure. This monocrystalline material of multiple oxide having the stereoscopic crystal structure can carry easily a dye (that is, a sensitizing dye) at the inside and/or on a surface thereof, and can maintain a state that the dye has been carried thereon.

In the electron transport layer 4 carrying the dye inside the crystal structure of the monocrystalline material constituting it, since a physical distance between atoms (ions) constituting the multiple oxide and molecules of the dye becomes close, electrons can be transferred from the dye to the multiple oxide more smoothly. Namely, an electron transport ability from the dye layer D to the electron transport layer 4 can be improved.

Further, since the monocrystalline material has hardly grain boundaries or has a very small number of grain boundaries, which the grain boundaries prevent electrons from moving, as compared with a polycrystalline material, the electron transport layer 4 can exhibit an excellent electron transport ability.

For these reasons, the electron transport layer 4 can transfer electrons generated in the dye layer D to the first electrode 3 efficiently. This makes it possible to improve the photoelectric conversion efficiency of the solar cell 1.

Furthermore, since such an electron transport layer 4 is constituted of the monocrystalline material, it has a small electric resistance component. Therefore, the electron transport layer 4 has an excellent electron transport ability. As a result, even in the case where the electron transport layer 4 is formed so that a thickness thereof is thick, significant decrease of the electron transport ability thereof can be suppressed.

Therefore, the electron transport layer 4 can be formed so as to have a relatively large thickness. This makes it possible to irregularly reflect or diffuse incident light within the electron transport layer 4. As a result, increase of the rate of transmitted light through the electron transport layer 4 can be suppressed.

Further, since a rate that the incident light can be in contact with the dye layer D is increased, it is possible to further improve a light availability efficiency (that is, a photoelectric conversion efficiency) in the dye layer D.

Furthermore, the monocrystalline material has only a very small number of microscopic defects such as point defect and line defect. Therefore, it is difficult for the incident light to be absorbed at the microscopic defects within the electron transport layer 4 constituted of the monocrystalline material.

Therefore, since the incident light is irregularly reflected or diffused within the electron transport layer 4 more efficiently, a rate that the incident light can be in contact with the dye layer D is further increased. Namely, the electron transport layer 4 constituted of the monocrystalline material has a high light-harvesting efficiency.

Further, it is preferred that a crystal structure of the monocrystalline material of multiple oxide has a layer structure, a tunnel structure or a perovskite structure. The monocrystalline material of multiple oxide having such a crystal structure can carry especially easily the dye at the inside and/or on the surface thereof.

Therefore, the total amount of the dye carried on the electron transport layer 4 becomes large. As a result, the photoelectric conversion efficiency of the solar cell 1 can be further improved.

As described above, although such a multiple oxide is not particularly limited to a specific type insofar as it contains two or more of metal oxides, it is preferred that the multiple oxide contains at least one metal element selected from the group comprising niobium, titanium, zinc, tin, vanadium, indium, tungsten, tantalum, zirconium, molybdenum and manganese.

All of these metal elements have a similar physical and chemical property, and form chemically stable multiple oxide together with alkaline metal atom (alkaline metal element) and the like. And this multiple oxide is preferably used as a constituent material of the electron transport layer 4 having a function of transporting electrons.

Among the multiple oxides each containing the metal atoms described above, potassium niobate or sodium titanate is particularly preferably used as the multiple oxide. The multiple oxide having such a composition is particularly chemically stable, and has an excellent electron transport ability. Therefore, such a multiple oxide is particularly preferably used as the constituent material of the electron transport layer 4.

In this regard, examples of the potassium niobate include $KNbO_3$, $K_4Nb_6O_{17}$, $K_2Nb_8O_{21}$, and the like. Specially, it is preferred that the potassium niobate is $K_4Nb_6O_{17}$ (potassium hexaniobate) or $K_2Nb_8O_{21}$ (potassium octaniobate).

A crystal structure of a monocrystalline material of the potassium hexaniobate has a layer structure, and a whole shape thereof is in the form of a flake. As a result, the potassium hexaniobate can carry a great amount of the dye between adjacent layers contained in the crystal structure thereof and/or on a surface of the crystal structure thereof.

Further, a crystal structure of a monocrystalline material of the potassium octaniobate has a tunnel structure, and a whole shape thereof is in the form of a whisker. Since the potassium octaniobate has distribution of a surface charge on an inner surface of the tunnel and/or a surface of the crystal structure (outer surface of the tunnel) due to a composition thereof and the crystal structure thereof, the potassium octaniobate can also carry a great amount of the dye on the inner surface of the tunnel and/or the surface of the crystal structure thereof.

Further, each of these monocrystalline materials has advantages that its recovery from poisoning due to a catalytic poison is carried out early and it has a long life, as well as it has a high light-harvesting efficiency as described above. The solar cell 1 provided with the electron transport layer 4 constituted of such monocrystalline materials can have a long life and a high photoelectric conversion efficiency.

On the other hand, examples of the sodium titanate include $Na_2TiO_3$, $Na_2Ti_3O_7$, $Na_4TiO_4$, $Na_2Ti_6O_{13}$, and the like. Specially, it is preferred that the sodium titanate is $Na_2Ti_3O_7$ (sodium trititanate) or $Na_2Ti_6O_{13}$ (sodium hexatitanate).

In the same manner as the potassium hexaniobate described above, a crystal structure of a monocrystalline material of the sodium trititanate also has a layer structure, and a whole shape thereof is in the form of a flake. As a result, the sodium trititanate can also carry a great amount of the dye between adjacent layers contained in the crystal structure thereof and/or on a surface of the crystal structure thereof.

In the same manner as the potassium octaniobate described above, a crystal structure of a monocrystalline material of the sodium hexatitanate also has a tunnel structure, and a whole shape thereof is in the form of a whisker. Since the sodium hexatitanate also has distribution of a surface charge on an inner surface of the tunnel and/or a surface of the crystal structure (outer surface of the tunnel) due to a composition thereof and the crystal structure thereof, the sodium hexatitanate can also carry a great amount of the dye on the inner surface of the tunnel and/or the surface of the crystal structure thereof.

Further, in the same manner as the potassium niobate described above, each of the monocrystalline materials of the sodium titanate has advantages that it has a high light-harvesting efficiency, its recovery from poisoning due to a catalytic poison is carried out early, and it has a long life. Therefore, the solar cell 1 provided with the electron transport layer 4 constituted of such monocrystalline materials can also have a long life and a high photoelectric conversion efficiency.

The monocrystalline material of multiple oxide may have any kind of form. Although an entire of the electron transport layer 4 may be formed into a single bulk-like monocrystalline material, it is preferred that, as shown in FIG. 2, the electron transport layer 4 is constituted of an aggregate in which particles 40 of the monocrystalline material of multiple oxide are aggregated.

This makes it possible to form the electron transport layer 4 without using a large size monocrystalline material which is difficult to produce. As a result, the electron transport layer 4 can be formed easily and economically.

Further, in the case where the entire of the electron transport layer 4 is formed into the single bulk-like monocrystalline material, a rupture is likely to be generated in the electron transport layer 4 easily. Namely, the electron transport layer 4 has a low durability against a stress.

In contrast, in the case where the electron transport layer 4 is constituted of the aggregate of the particles 40 of the monocrystalline material, since a stress which would be generated in the electron transport layer 4 can be dispersed, the electron transport layer 4 can have an improved durability against the stress.

Therefore, even in the case where the solar cell 1 which is formed using, for example, a high flexible material as the constituent material of the substrate 2 and the entire of the thus formed solar cell 1 is bent, the solar cell 1 can maintain a photoelectric conversion function thereof efficiently.

In this case, an average particle size of the particles of the monocrystalline material of multiple oxide is preferably in the range of about 0.01 to 150 μm, and more preferably in the range of about 0.05 to 50 μm. By setting the particles 40 of the monocrystalline material of multiple oxide to a value within the above range, each of the particles 40 can have an adequate particle size.

As a result, the electron transport layer 4, which is constituted of the aggregate of the particles 40 each having such an adequate particle size, can behave like an electron transport layer constituted of a single bulk-like monocrystalline material in transportation of electrons.

Further, since each of the particles 40 has an adequate particle size, by dispersing the particles 40 into a dispersion medium, a dispersion liquid in which the particles 40 are dispersed into the dispersion medium uniformly can be prepared. As a result, use of such a dispersion liquid makes it possible to form the electron transport layer 4 using an coating method efficiently. Further, the particles 40 can distribute uniformly in the thus formed electron transport layer 4.

For these reasons, it is possible to obtain an electron transport layer 4 constituted of the monocrystalline material of multiple oxide easily and economically, while maintaining properties of the monocrystalline material itself.

Further, an average thickness of the electron transport layer 4 is not particularly limited to a specific value, but is preferably in the range of about 1 to 300 μm, more preferably in the range of about 5 to 100 μm, and even more preferably in the range of about 10 to 50 μm. By setting the average thickness of the electron transport layer 4 to a value within the above range, the electron transport layer 4 can carry an adequate amount of the dye.

In such an electron transport layer 4, as shown in FIG. 2, a dye d is carried inside the particles 40. In this way, the dye layer D is formed. Further, the dye d is carried on surfaces of the particles 40, but it is not shown in FIG. 2. The dye d generates electrons and holes therein by receiving light.

The dye d carried on the particles 40 is in contact with both of the electron transport layer 4 and the electrolyte layer 5. This makes it possible to transfer the electrons generated in the dye layer D to the electron transport layer 4 and transfer the holes generated in the dye layer D to the electrolyte layer 5 efficiently.

As for the dye d constituting the dye layer D, pigments and dyes may be used independently or in combination. From the viewpoint of small alteration and degradation with the lapse of time, it is preferable to use pigments as the dye d. On the other hand, from the view point of excellence in adsorption to (bonding with) the electron transport layer 4, it is preferable to use dyes for coloring use.

Further, as for the dye d, various pigments such as organic pigments and inorganic pigments can be used. Examples of the organic pigment include: phthalocyanine type pigments such as phthalocyanine green, and phthalocyanine blue; azo type pigments such as fast yellow, disazo yellow, condensation azo yellow benzimidazolone yellow, dinitroaniline orange, benzimidazolone orange, toluidine red, permanent carmine, permanent red, naphthol red, condensation azo red, benzimidazolone carmine, and benzimidazolone brown;

anthraquinone type pigments such as anthrapyrimidine yellow, and anthraquinonyl red; azomethine type pigments such as copper azomethine yellow; quinophthalone type pigments such as quinophthalone yellow; isoindoline type pigments such as isoindoline yellow; nitroso type pigments such as nickel dioxine yellow; perinone type pigments such as perinone orange; quinacridone type pigments such as quinacridone magenta, quinacridone maroon, quinacridone scarlet, and quinacridone red; perylene type pigments such as perylene red, and perylene maroon; pyrropyrrol type pigments such as diketo pyrropyrrol red; and dioxazine type pigments such as dioxazine violet; and the like.

Example of the inorganic pigment include: carbon type pigments such as carbon black, lamp black, furnace black, ivory black, graphite, and fullerene; chromate type pigments such as chrome yellow, and molybdate orange; sulfide type pigments such as cadmium yellow, cadmium lithopone yellow, cadmium orange, cadmium lithopone orange, vermilion, cadmium red, and cadmium lithopone red; oxide type pigments such as ochre, titanium yellow, titanium-barium-nickel yellow, red iron oxide, red lead, umber, brown iron oxide, zinc iron chromite brown spinel, chromium oxide, cobalt green, cobalt chromite green spinel, cobalt titanate green spinel, cobalt blue, cerulean blue, cobalt-aluminum-chromium blue, black iron oxide, manganese ferrite black, cobalt ferrite black, copper chromite black spinel, and copper chromite manganese black; hydroxide type pigments such as viridian green; ferrocyanide type pigments such as prussian blue; silicate type pigments such as ultramarine blue; phosphate type pigments such as cobalt violet, and mineral violet; other type pigments (such as cadmium sulfide, cadmium selenide); and the like. In this case, one kind of these pigments or a mixture of two or more kinds of these pigments may be employed.

On the other hand, Examples of the dye include metal complex dye such as $RuL_2(SCN)_2$, $RuL_2Cl_2$, $RuL_2(CN)_2$, Ruthenium535-bisTBA (produced by Solaronics, Inc.), and $[RuL_2(NCS)_2]_2H_2O$; cyan dye; xanthene dye; azo dye; hibiscus color; black berry color; raspberry color; pomegranate juice color; chlorophyll; and the like. In this case, one kind of these dyes or a mixture of two or more kinds of these dyes may be employed. In this regard, it is to be noted that "L" in the chemical formula described above indicates 2,2'-bipyridine or its derivatives thereof.

The electrolyte layer 5 is provided in contact with the dye layer D. The electrolyte layer 5 has a function of capturing and transporting the holes generated in the dye layer D.

As shown in FIG. 2, the electrolyte layer 5 of this embodiment is formed such that a part thereof enters the electron transport layer 4. Since the contact area of the dye layer D and the electrolyte layer 5 can be increased in this way, the holes generated in the dye layer D can be transferred to the electrolyte layer 5 with a higher efficiency. As a result, the solar cell 1 can further enhance a power generation efficiency.

The electrolyte layer 5 may be in the form of a liquid, a gel or a solid. In this regard, it is to be noted that a liquid electrolyte layer 5 is shown in FIGS. 1 and 2.

The liquid electrolyte layer 5 is formed of a electrolyte solution in which a redox electrolyte (that is, a oxidation-reduction substance or electrolyte composition) is dissolved into a solvent.

Examples of the redox electrolyte include: halogen-based electrolytes such as an $I/I_3$-based electrolyte, a $Br/Br_3$-based electrolyte, a $Cl/Cl_3$-based electrolyte, a $F/F_3$-based electrolyte; a quinine/hydroquinone-based electrolyte; and the like. One of these electrolytes may be used singly, or two or more of these electrolytes may be used in combination.

Further, examples of the solvent include various kinds of waters, acetonitrile, ethylene carbonate, propylene carbonate, polyethylene glycol, and the like. One of these solvents may be used singly, or two or more of these solvents may be used in combination as a mixed solvent.

Among them, an iodine solution (that is, $I/I_3$-based solution) is especially preferably used as the electrolyte solution. Specifically, for example, a solution in which iodine and potassium iodide are dissolved into ethylene glycol, a solution in which dimethylhexylimidazolium, iodine and lithium iodide are dissolved into acetonitrile adding a certain amount of tertiary-butylpyridine, Iodolyte TG50 (produced by Solaronics, Inc.), 1,2-dimethyl-3-propylimidazolium iodide, and the like can be used as the electrolyte solution.

The concentration (content) of the electrolyte composition in the electrolyte solution is not particularly limited to a specific value, but is preferably in the range of about 0.1 to 25 wt %, and more preferably in the range of about 0.5 to 15 wt %.

Further, for example, a gel electrolyte layer 5 is formed by containing the electrolyte solution described above into the gel base material. The gel base material is constituted of a resin material as a main component thereof. Examples of the resin material include thermoplastic resin, thermosetting resin, a copolymer, a compound having siloxane bonds, and the like, and these materials may be used singly or in combination of any two or more of them.

Examples of the thermoplastic resin include polyethylene oxide (PEO), polyacrylonitrile (PAN), polyvinylidene fluoride (PVDF), polymethyl methacrylate (PMMA), and the like, and these thermoplastic resins may be used singly or in combination of two or more of them. Further, examples of the thermosetting resin include polyimide resin (PI), epoxy resin, phenol resin, urea resin, and the like.

Further, the copolymer can be obtained by polymerizing at least two kinds of compounds (a precursor of the copolymer) by an ionic polymerization (e.g., cationic polymerization or anionic polymerization), a radical polymerization or a combination of them.

Examples of the copolymer include epoxy-based copolymer, vinyl ether-based copolymer, oxetane-based copolymer, urethaneacrylate-based copolymer, epoxyacrylate-based copolymer, esteracrylate-based copolymer, acrylate-based copolymer, and the like.

Therefore, examples of the above compound (precursor of the copolymer) include urethane, polyacene, polyacetylene, polyethylene, polycarbon, polypyrrole, polyaniline, activated sulfur, and the like, and these compounds may be used by selecting any two or more of them.

Further, examples of the compound having siloxane bonds include polysiloxane, polydimethylsiloxane, polyalkylphenylsiloxane, polymetallosiloxane substituted a part of silicon atoms to another metal atom(s) such as aluminum or titanium, and the like.

Furthermore, a solid electrolyte layer 5 is formed using an organic high molecular weight compound, an organic low molecular weight compound, an inorganic material, and the like, and these materials can be used singly or in combination of two or more of them.

Examples of the organic high molecular weight compound include: organic polymers such as polyarylamine, fluorene-arylamine copolymer, fluorene-bithiophene copolymer, poly (N-vinylcarbazole), polyvinylpyrene, polyvinylanthracene, polythiophene, polyalkylthiophene, polyhexylthiophene, poly(p-phenylenevinylene), polythienylenevinylene, pyreneformaldehyde resin, ethylcarbazoleformaldehyde resin or derivatives thereof; dendrimer having thiophene in a structure thereof; and the like.

Further, examples of the organic low molecular weight compound include naphthalene, anthracene, tetracene, pentacene, hexacene, phthalocyanine, perylene, hydrazone, triphenylmethane, diphenylmethane, stilbene, arylvinyl (vinylarene), pyrazoline, triphenyl amine, triaryl amine, oligothiophene, phthalocyanine or derivatives thereof, and the like. Furthermore, examples of the inorganic material include CuI, AgI, AgBr, CuSCN, and the like. In this case, the above compounds can be used singly or in combination of two or more of them.

In this regard, it is to be noted that a mixture is prepared by mixing the organic polymer with another polymer, and the solid electrolyte layer 5 can be formed using such a mixture. Examples of a mixture containing polythiophene include poly(3,4-ethylenedioxythiophene/styrenesulfonic acid) (PEDOT/PSS), and the like.

An average thickness of the electrolyte layer 5 is not particularly limited to a specific value, but is preferably in the range of about 1 to 500 µm, more preferably about 10 to 300 µm, and even more preferably about 10 to 100 µm. In this regard, it is to be noted that the thickness of the electrolyte layer 5 is measured by omitting a part where the electrolyte layer 5 is entered into the electron transport layer 4.

On the electrolyte layer 5, that is, on the opposite side of the first electrode 3, the second electrode 6 is arranged opposite to the first electrode 3.

Examples of a constituent material of the second electrode 6 include: metal oxide materials such as indium-tin oxide (ITO), fluorine-doped tin oxide (FTO), indium oxide ($InO_2$), and tin oxide ($SnO_2$); metal materials such as aluminum, nickel, cobalt, platinum, silver, gold, copper, molybdenum, titanium, and tantalum, and alloys thereof; various kinds of carbon materials such as graphite; and the like, and one kind or a combination of two or more kinds of these materials may be used.

Furthermore, the second electrode 6 may be formed by combining with a film-like electrode. When combining these electrodes, they may be laminated with each other. In this regard, it is to be noted that an average thickness of the second electrode 6 is appropriately set depending on its constituent material, usage of the solar cell 1 or the like, and is not limited particularly to a specific value.

When light is incident on the solar cell 1 having such the structure described above, electrons are excited to generate pairs of an electron ($e^-$) and a hole ($h^+$) mainly in the dye layer D. The electrons move to the electron transport layer 4 and the holes move to the hole transport layer 5, respectively. With this result, a potential difference (photpvoltaic force) is generated across the first electrode 3 and the second electrode 6, and a current (photoexcited current) flows in the external circuit 10.

Moreover, in the solar cell 1, when a positive and a negative voltage is applied to the first electrode 3 and the second electrode 6, respectively, with their difference being 0.5 V, it is preferred that the solar cell 1 has a property that its resistance is a value equal to or larger than 100 $\Omega/cm^2$, and more preferably equal to or larger than 1 $k\Omega/cm^2$.

The reason why it should have such a property means that short-circuit due to electrical contact or the like between the first electrode 3 and the electrolyte layer 5 is properly prevented or suppressed in the solar cell 1. Accordingly, such a solar cell 1 can further enhance the power generation efficiency (photoelectric conversion efficiency).

In this regard, it is to be noted that a barrier layer may be provided between the first electrode 3 and the electron transport layer 4, if needed. This barrier layer has a function of preventing or suppressing occurrence of direct contact between the first electrode 3 and the electrolyte layer 5.

By providing such a barrier layer, it is possible to prevent a leakage current from flowing between the first electrode 3 and the electrolyte layer 5 effectively. As a result, decrease of the photoelectric conversion efficiency of the solar cell 1 can be prevented.

Examples of a constituent material of the barrier layer include $TiO_2$, $SrTiO_3$, ZnO, $SiO_2$, $Al_2O_3$, $SnO_2$, CdS, CdSe, TiC, $Si_3N_4$, SiC, $B_4N$, BN, and the like. In this case, one kind or a combination of two or more kinds of these materials may be used.

Further, it is preferred that an average thickness (film thickness) of the barrier layer is in the range of about 0.01 to 10 µm, more preferably in the range of about 0.1 to 5 µm, and even more preferably about 0.5 to 2 µm. By setting the average thickness of the barrier layer to a value within the above range, it is possible to further enhance the effect described in the above.

Such a barrier layer can be formed, for example, by a sol-gel method, an evaporation (vacuum evaporation) method, a sputtering method such as a high frequency sputtering method or a DC sputtering method, a spray thermal decomposition method, a jet molding (plasma spraying) method, a CVD method, or the like.

Such a solar cell 1 can be manufactured in the following manner.

<1> First, before the solar cell 1 is manufactured, a monocrystalline material of multiple oxide constituting an electron transport layer 4 is prepared.

The monocrystalline material of multiple oxide may be formed using various kinds of crystal growth methods. Hereinbelow, a case that the monocrystalline material of multiple oxide is formed using a flux method will be described as a representative.

Further, hereinbelow, a case that the electron transport layer 4 is constituted of an aggregate in which particles of the monocrystalline material of multiple oxide are aggregated, and an electrolyte layer 5 is in the form of a liquid will be described as an example.

<1-1> First, a starting material (solute) to be used for forming multiple oxide constituting the electron transport layer 4 and a flux are put into a crucible.

For example, in the case of formation of the monocrystalline material of potassium niobate, $K_2CO_3$ and $Nb_2O_5$ are used as the solute, and KCl (singly) or a mixture of $K_2CO_3$ and $MoO_3$ is used as the flux.

Further, for example, in the case of formation of the monocrystalline material of sodium titanate, $TiO_2$ (singly) or a mixture of $Na_2CO_3$ and $TiO_2$ is used as the solute, and NaCl is used as the flux.

<1-2> Next, the crucible is covered by a lid lightly, and then is heated so that the solute and the flux are melted. Thereafter, this state is maintained for a predetermined time, and then the crucible is cooled at a predetermined cooling rate.

Now, a heating temperature at which the crucible is heated is set to a value equal to or higher than a melting point of the solute and the flux to be used. In the case of formation of the monocrystalline material of potassium niobate, it is preferred that the heating temperature is set to a value equal to or higher than 700° C., and lower than a melting point of the monocrystalline material which will be formed.

Further, in the case of formation of the monocrystalline material of sodium titanate, it is also preferred that the heating temperature is set to a value equal to or higher than 700° C., and lower than a melting point of the monocrystalline material which will be formed. In this regard, it is to be noted that in view of a loading to the environment and a heat-resistant temperature of an apparatus to be used for heating the crucible, it is preferred that the heating temperature is set to a value equal to or lower than 1,100° C.

Further, the time maintaining the above heating temperature is not particularly limited to a specific value because it should be adjusted depending on a capacity of the crucible, but is preferably in the range of 1 to 1000 hours in one example.

Furthermore, during the heating process, the heating rate can be adjusted depending on the capacity of the crucible, a desired quality and manufacturing efficiency of the monocrystalline material which will be formed, or the like. For this reason, the heating rate is not particularly limited to a specific value, but is preferably in the range of 1 to 1500° C./hour in one example.

In the same manner as the heating rate, during the cooling process, the cooling rate can also be adjusted depending on the capacity of the crucible, a desired quality and manufacturing efficiency of the monocrystalline material which will be formed, or the like. For this reason, the cooling rate is not also particularly limited to a specific value, but is preferably in the range of 0.1 to 60,000° C./hour in one example.

In this regard, it is to be noted that in the case where the flux method is used as the crystal growth method, a crystal (that is, monocrystalline material) is grown using evaporation of the flux as a driving force of a crystal growth. In this case, there is an advantage that a monocrystalline material having an adequate quality can be formed without controlling exactly the cooling rate.

Namely, in the cooling process of the flux method, it is sufficient that the crucible is cooled on standing after the heating process. In this way, the monocrystalline material of multiple oxide is formed inside the crucible.

<2> Next, the formed monocrystalline material of multiple oxide is crushed to obtain a powdery monocrystalline material (that is, particles 40 of the monocrystalline material). Next, the obtained particles 40 are dispersed into a dispersion medium, and then the dispersion medium is stirred, to thereby obtain a dispersion liquid being in the form of paste.

Examples of the dispersion medium include: various kinds of waters; alcohols such as methanol, ethanol, isopropanol, ethylene glycol, diethylene glycol, and glycerine; cellosolves such as methyl cellosolve, ethyl cellosolve, and phenyl cellosolve; esters such as methyl acetate, and ethyl acetate; ketones such as acetone, methyl ethyl ketone, and cyclohexanone; aliphatic hydrocarbons such as pentane, hexane, and octane; alicyclic hydrocarbons such as cyclohexane, and methylcyclohexane; aromatic hydrocarbons such as benzene, toluene, xylene, and dodecylbenzene (that is, one kind of benzenes having long-chain alkyl group(s)); halogenated hydrocarbons such as methylene chloride, and chloroform; aromatic heterocyclic compounds such as pyridine, pyrazine, furan, pyrrole, thiophene, and methyl pyrrolidone; nitriles such as acetonitrile, propionitrile, and acrylonitrile; amides such as N,N-dimethylformamide, and N,N-dimethylacetamide; carboxylate; various kinds of oils; and the like, and one kind or a combination of two or more kinds of these solvents may be used.

In this regard, it is to be noted that the dispersion liquid may be subjected to a kneading process or the like, if needed. For kneading the dispersion liquid, it is possible to use various kinds of kneading machines such as a kneader, a batch type triaxial roll, a continuous biaxial roll, a wheel mixer, a blade mixer, and the like, or various kinds of milling machines such as a ball mill, a beads mill, and the like.

Further, the thus obtained dispersion liquid may be subjected to a viscosity control. The viscosity control of the dispersion liquid can be carried out by adding a viscosity modifier into the dispersion liquid, controlling a temperature of the dispersion liquid, removing the dispersion medium from the dispersion liquid, or the like.

Examples of the viscosity modifier include polyethylene glycol, polyvinyl alcohol, hydroxypropyl cellulose, carboxymethyl cellulose, hydroxyethyl cellulose, methyl cellulose, water soluble acryl resin, polyvinyl pyrrolidone, gum arabic starchy, and the like, and one kind or a combination of two or more kinds of these materials may be used.

<3> Next, a substrate 2 is prepared, and then a first electrode 3 is formed on the substrate 2, as shown in FIG. 3(a). In this case, the first electrode 3 can be formed using, for example, an evaporation method, a sputtering method, a printing method, or the like.

<4> Next, an electron transport layer 4 is formed on the first electrode 3.

<4-1> First, the dispersion liquid containing the particles 40 of the monocrystalline material of multiple oxide, which is formed in the above step <2>, is applied onto the first electrode 3 by an coating method. This makes it possible to form a liquid coating 41 on the first electrode 3, as shown in FIG. 3(b).

In this case, a spin coating method, a dip coating method, a squeegee printing method, a screen printing method, a droplet ejecting method, or the like can be used as the coating method.

<4-2> Next, the dispersion medium is removed from the liquid coating 41 so that it is dried and solidified, to thereby obtain the electron transport layer 4, which is constituted of an aggregate in which the particles 40 of the monocrystalline material are aggregated, on the first electrode 3, as shown in FIG. 3(c).

Examples of a method for removing the dispersion medium from the liquid coating 41 include: a method in which the liquid coating 41 is dried on standing; a method in which a gas such as air, nitrogen gas or the like is blown on the liquid coating 41; a method in which the liquid coating 41 is lyophilized; a method in which the liquid coating 41 is heat-treated at a relatively low temperature; and the like.

Among these methods, the method in which the liquid coating 41 is heat-treated at a relatively low temperature is preferably used. By using such a method, even in the case where the liquid coating 41 has a large size area, the dispersion medium can be removed from the liquid coating 41 efficiently.

In this case, in the formed electron transport layer 4, the particles 40 of the monocrystalline material of multiple oxide are merely in contact with each other. However, each of the particles 40 themselves constituted of the monocrystalline material has a high electron transport ability. In addition, contact resistance at the contact surface between particles 40 is low.

For these reasons, the electron transport layer 4 can behave like an electron transport layer constituted of a single bulk-like monocrystalline material in transportation of electrons so that it can have an excellent electron transport ability as a whole thereof.

Further, in the past, in the case where an electron transport layer has been formed, it has been heat-treated at a high temperature to improve the electron transport ability thereof. Therefore, there was a problem in that a substrate and an electrode were alternated or deteriorated due to the heat, as a result of which, a function of a solar cell obtained was decreased.

In contrast, as described above, in the case where the electron transport layer 4 is constituted of the particles 40 of the monocrystalline material of multiple oxide, during forming the electron transport layer 4, the heat-treatment at a high temperature can be omitted. A temperature in this heat-treating step may be set to a level that can volatilize and remove the dispersion medium from the liquid coating 41.

Namely, the above temperature can be set to a value lower than a heat-resistant temperature of each of the substrate 2 and the first electrode 3. This makes it possible to prevent the substrate 2 and the first electrode 3 from being alternated or deteriorated due to the heat, and to prevent the function of the solar cell 1 from being decreased. Therefore, from this point of view, the function (photoelectric conversion efficiency) of the solar cell 1 becomes high.

Further, since the heat-treatment at high temperature can be omitted, there is an advantage that materials each having a relatively low heat-resistant temperature can be used as the constitute materials of the substrate 2 and the first electrode 3. Specifically, the above temperature can be set to an appropriate value depending on the constitute material of each of the substrate 2 and the first electrode 3.

Namely, the above temperature is preferably set to a value lower than a heat-resistant temperature of a material having a relatively low melting point or softening point, which is generally used as the constitute material of each of the substrate 2 and the first electrode 3. Specifically, the temperature is preferably in the range of 70 to 450° C., and more preferably in the range of 70 to 250° C. This makes it possible to prevent the substrate 2 and the first electrode 3 from being alternated or deteriorated due to the heat more reliably.

Further, it is preferred that the first electrode 3 is constituted of a metal oxide material as a main component thereof. Generally, there was a problem in that an electrode constituted of the metal oxide material had an excellent translucency, but did not have high heat resistance. However, as described above, since the monocrystalline material of multiple oxide is used as the constitute material of the electron transport layer 4 in this embodiment, the heat-treatment at a high temperature can be omitted during forming the electron transport layer 4. Therefore, even in the case where the first electrode 3 is formed using the metal oxide material, decrease of excellent properties such as excellent translucency and electric conductivity of the first electrode 3 can be prevented. As a result, it is possible to obtain a solar cell 1 having an excellent photoelectric conversion efficiency.

For the above reasons, according to the present invention, the substrate 2 can be formed from not only a glass substrate having relatively high heat resistance, but also a resin substrate having relatively low heat resistance. Since this resin substrate has high flexibility, by using it as the substrate 2, it is possible to obtain a solar cell 1 having high flexibility while maintaining an excellent photoelectric conversion efficiency thereof.

<5> Next, the electron transport layer 4 is contacted with a dye solution containing the dye (sensitizing dye). In this way, as shown in FIG. 2, the dye is penetrated into the monocrystalline material of multiple oxide constituting the electron transport layer 4 and adsorbed on the surface thereof (that is, the surfaces of the particles 40 of the monocrystalline material) so that the dye layer D is formed so as to be in contact with the electron transport layer 4.

Examples of a method for contacting the electron transport layer 4 with the dye solution include: a method (dipping method) in which the substrate 2 provided with the electron transport layer 4 is dipped into the dye solution D1, as shown in FIG. 4(d); a method (spraying method) in which the dye solution is applied in the form of a mist (droplets); or the like, but the dipping method is preferably used. By selecting the dipping method, the dye d is carried on the electron transport layer 4 uniformly and efficiently.

In this case, the dipping time that the electron transport layer 4 is dipped into the dye solution D1 is not particularly limited to a specific value, but is preferably in the range of about 0.5 to 72 hours, and more preferably in the range of about 2 to 24 hours. By setting the dipping time to a value within the above range, the dye d can be carried on the electron transport layer 4 with a necessary and sufficient amount.

In this regard, it is to be noted that although the dipping time may be set to a value larger than the above upper limit value, the amount of the dye d to be carried on the electron transport layer 4 cannot be expected to further increase.

Further, in this case, a temperature of the dye solution D1 is not particularly limited to a specific value, but is preferably in the range of about 20 to 100° C., and more preferably in the range of about 50 to 90° C. By setting the temperature of the dye solution D1 to a value within the above range, alteration, changing color, decrease of a photoelectric conversion efficiency, or the like of the dye d can be prevented, and the dye d is carried on the electron transport layer 4 efficiently.

The electron transport layer 4, which has been dipped into the dye solution D1, is dried, if needed. The drying of the dye solution D1 can be carried out using the same method as the above method used for removing the dispersion medium.

<6> Next, a facing substrate 7 is prepared, and a second electrode 6 is formed on the facing substrate 7. This second electrode 6 can be formed using the same method as the above method used for forming the first electrode 3.

Figure 4E:
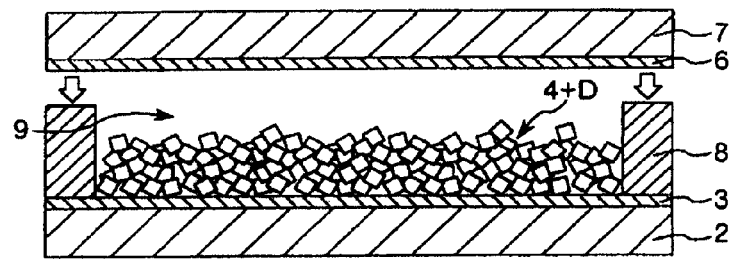

<7> Next, as shown in FIG. 4(e), the facing substrate 7 provided with the second electrode 6 is set so as to face the second electrode 6 to the first electrode 3. Thereafter, a partition 8 is formed between the first electrode 3 and the second electrode 6, and along circumferences of the first electrode 3 and the second electrode 6, to thereby obtain a space 9 which is defined by the first electrode 3, the second electrode 6 and the partition 8.

In this regard, it is to be noted that the partition 8 has a through hole (not shown in drawings) so as to communicate the inside and the outside of the space 9. Examples of a constituent material of the partition 8 include: various kinds of adhesives such as an epoxy-based adhesive and a silicone-based adhesive; various kinds of resin materials such as epoxy-based resin and silicone-based resin; and the like.

Figure 4F:
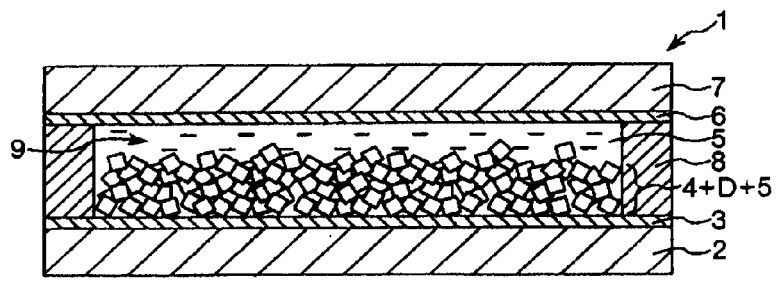

<8> Next, as shown in FIG. 4(f), an electrolyte solution is injected into the space 9 through the through hole so that the electrolyte solution is filled within the space 9, to thereby form a liquid electrolyte layer 5. At this time, the electrolyte solution is also penetrated into the electron transport layer 4. Thereafter, the through hole is sealed using the constitute material of the partition 8 so that the space 9 is sealed in a liquid-tight state.

In this regard, it is to be noted that in the case where the solid electrolyte layer 5 is provided in the solar cell 1, the solid electrolyte layer 5 may be formed on the electron transport layer 4 (dye layer D) before the step <7>.

Further, in the case where the gel electrolyte layer 5 is provided in the solar cell 1, the gel electrolyte layer 5 is formed by injecting the electrolyte solution containing a gelling agent into the space 9, and setting the electrolyte solution by the action of the gelling agent.

<9> Next, ends of the external circuit 10 are connected to the first electrode 3 and the second electrode 6, respectively. The solar cell 1 (photoelectric conversion device of the present invention) can be manufactured according to the processes described in the above.

In this embodiment, the electron transport layer 4 is formed on the first electrode 3, and then the dye d is carried on the electron transport layer 4. However, the electron transport layer 4 carrying the dye d may be formed by allowing the dye d to be carried on the particles 40 constituting the electron transport layer 4 in advance, and then applying a dispersion liquid containing these particles 40 carrying the dye d onto the first electrode 3.

The electronic equipment of the present invention is provided with the solar cell 1 described above.

The electronic equipment of the present invention will be described with reference FIGS. 5 and 6.

Figure 5:
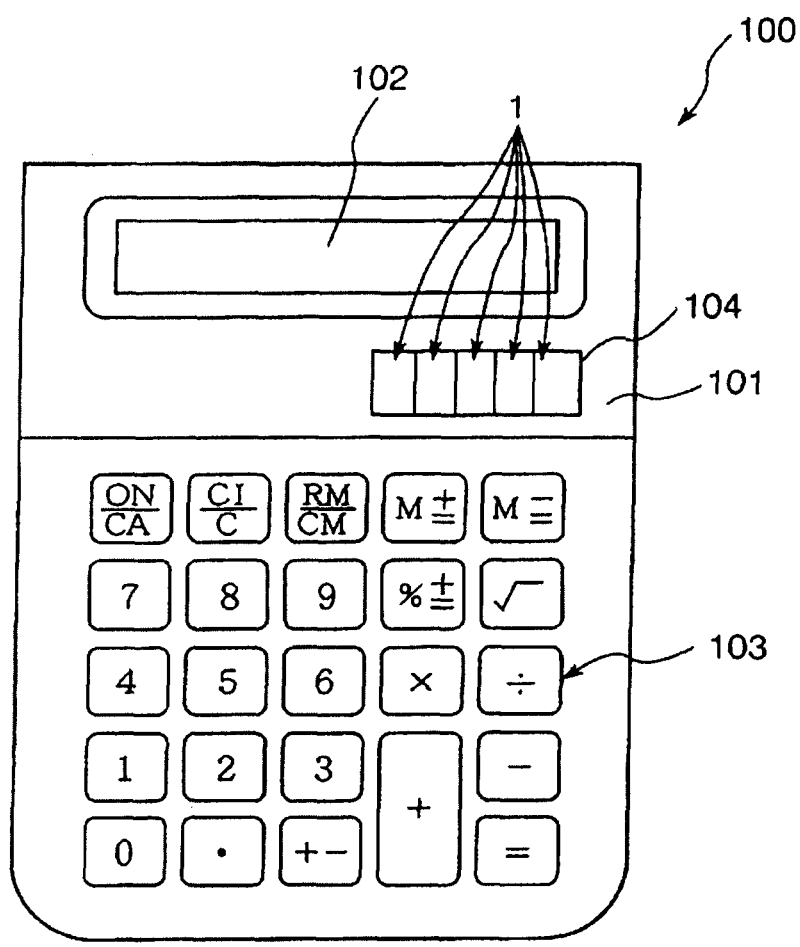
FIG. 5 is a plain view which shows an electronic calculator which is one example of the electronic equipment of the present invention.

FIG. 5 is a plain view which shows an electronic calculator which is one example of the electronic equipment of the present invention. FIG. 6 is a perspective view which shows a mobile phone (including a personal handyphone system (PHS)) which is another example of the electronic equipment of the present invention.

The electronic calculator 100 shown in FIG. 5 includes a main body 101. Further, on an upper surface (front surface) of the main body 101, a displaying section 102, a plurality of operation buttons 103 and a placing section 104 where at least one of the solar cell 1 is provided.

In the electronic calculator 100 shown in FIG. 5, five solar cells 1 are placed on the placing section 104 in a state that they are connected serially.

Figure 6:
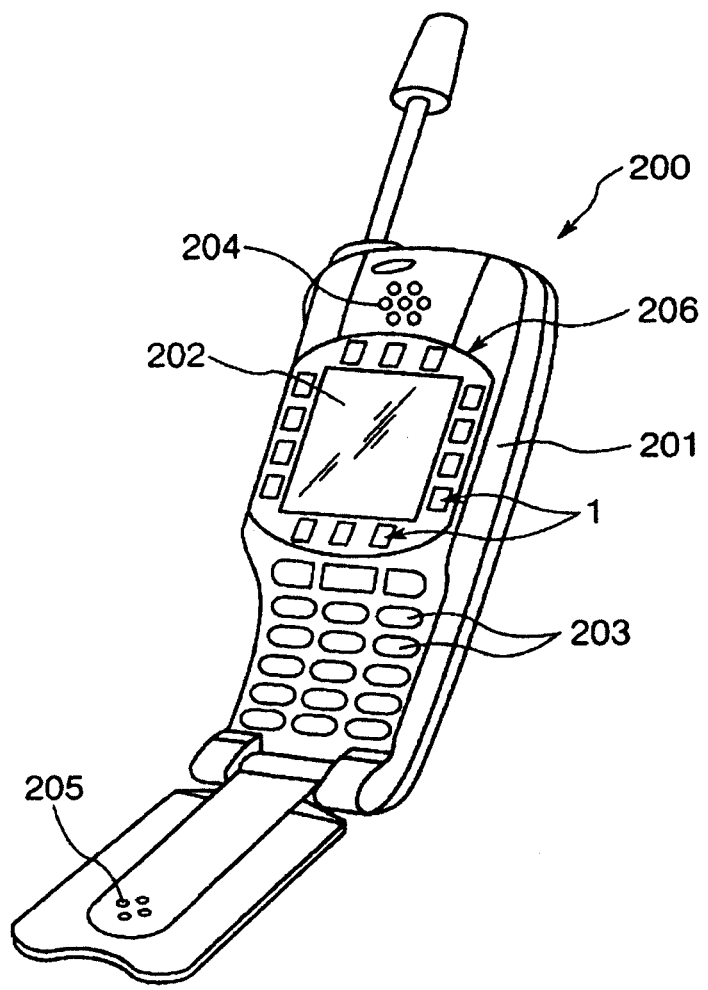
FIG. 6 is a perspective view which shows a mobile phone (including a personal handyphone system (PHS)) which is another example of the electronic equipment of the present invention.

The mobile phone 200 shown in FIG. 6 includes a main body 201. Further, on a front surface of the main body 201, a displaying section 202, a plurality of operation buttons 203, an earpiece 204, a mouthpiece 205 and a placing section 206 where at least one of the solar cell 1 is provided.

In the mobile phone 200 shown in FIG. 6, the placing section 206 is arranged so as to surround the displaying section 202, and a plurality of the solar cells 1 are placed on the placing section 104 in a state that they are connected serially.

In the above, the photoelectric conversion device and the electronic equipment according to the present invention have been described based on each illustrated embodiment, but the present invention is not limited to these structures. Each part constituting the photoelectric conversion device and the electronic equipment may be replaced by a part of an arbitrary constitution or structure that can exhibit similar function.

Moreover, the photoelectric conversion device according to the present invention is applicable not only to the solar cell, but also to various kinds of devices (light receiving devices), such as an optical sensor and an optical switch, that convert received optical energy into electrical energy.

Furthermore, in the photoelectric conversion device according to the present invention, the light incidence direction may be in the opposite direction, different from that shown in the figures, that is, the light incidence direction may be arbitrary.

EXAMPLES

Hereinbelow, a description will be made with regard to the actual examples of the present invention. In this regard, it is to be noted that the present invention is not limited to these actual examples.

1. Manufacturing of Solar Cell (Photoelectric Conversion Device)

Example 1

A solar cell (photoelectric conversion device) shown in FIG. 1 was manufactured as follows.

<1A> First, as a starting material (solute), 1.433 g of $K_2CO_3$ (produced by Wako Pure Chemical Industries, Ltd.) and 4.134 g of $Nb_2O_5$ (produced by Wako Pure Chemical Industries, Ltd.) were placed into a crucible made of platinum and having a diameter of 36 mm and a height of 40 mm. Further, as a flux, 9.519 g of $K_2CO_3$ (produced by Wako Pure Chemical Industries, Ltd.) and 9.914 g of $MoO_3$ (produced by Wako Pure Chemical Industries, Ltd.) were placed into the crucible. And, the solute and the flux were mixed in the crucible, and an opening of the crucible was covered by a lid lightly.

<2A> Next, the crucible was conveyed into an oven, heated up to 1,100° C. at a heating rate of 45° C./hour. The temperature (1,100° C.) was maintained for 10 hours. Thereafter, the crucible was cooled up to 500° C. at a cooling rate of 5° C./hour, conveyed outside the oven, and then cooled up to a room temperature. In this way, a monocrystalline material was obtained.

<3A> Next, the monocrystalline material was removed from the inside of the crucible. The monocrystalline material was subjected to a crystalline analysis using a X-ray diffraction by XRD-6000 (produced by Shimadzu Corporation). As a result, the obtained monocrystalline material was potassium hexaniobate ($K_4Nb_6O_{17}$).

<4A> Next, the obtained monocrystalline material was ground using a mortar to obtain a powdery monocrystalline material (that is, particles of the monocrystalline material). In this regard, an average particle size of the particles was 15 μm. Subsequently, 25 mL of distilled water and 7.5 g of polyethylene glycol were mixed to obtain a mixed solution, and then 3 g of the obtained particles was added into the mixed solution with being stirred.

Thereafter, the mixed solution was further stirred for hours to thereby obtain a dispersion liquid in which the particles of the monocrystalline material of potassium hexaniobate were dispersed into the mixed solution.

<5A> Next, prepared was a glass substrate (substrate) having an average thickness of 1 mm and provided with a FTO film (first electrode) having an average thickness of 1 μm.

<6A> Thereafter, the dispersion liquid obtained in the above step <4A> was applied onto the FTO film by a squeegee printing method to thereby obtain a liquid coating on the FTO film.

<7A> Next, the liquid coating was heated at 450° C. so that the dispersion medium was removed from the liquid coating to thereby obtain an electron transport layer having an average thickness of 25 μm.

<8A> Next, cis-bis(thiocyanato)-N,N-bis(2,2'-bipyridyl-4,4'-dicarboxylato) ruthenium(II) dihydrate (N719) was added into dried ethanol so that its concentration became $4 \times 10^{-4}$ mol % to thereby prepare a dye solution (a temperature thereof was 80° C.). Thereafter, the glass substrate provided with the electron transport layer was dipped into the dye solution for 4 hours.

Next, the glass substrate is removed from the dye solution while a nitrogen gas was blown to the glass substrate. As a result, the dye is carried into and/or on the monocrystalline material of potassium hexaniobate.

<9A> Next, prepared was a facing substrate provided with a FTO film having an average thickness of 1 μm and a platinum film in this order from the side of the facing substrate. In this regard, it is to be noted that the facing substrate was made of glass had an average thickness of 1 mm.

<10A> Next, two glass substrates were set at a certain distance so as to face the platinum film to the electron transport layer, and then an epoxy-based adhesive was applied between two electrodes and along circumferences thereof, to thereby form a partition. In this regard, it is to be noted that the partition was formed so as to leave a through hole.

<11A> Next, an electrolyte solution (produced by Solaronix, Inc., "Iodolyte AN-50") was injected between electrodes through the through hole to thereby obtain an electrolyte layer.

<12A> Next, the through hole was sealed by an epoxy-based adhesive to thereby obtain a solar cell.

Example 2

A solar cell was obtained in the same manner as in Example 1, except that a monocrystalline material of sodium hexatitanate ($Na_2Ti_6O_{13}$) was obtained as follows, and the electron transport layer was formed using the obtained monocrystalline material.

<1B> First, as a starting material (solute), 0.174 g of $Na_2CO_3$ (produced by Wako Pure Chemical Industries, Ltd.) and 0.788 g of $TiO_2$ (produced by Wako Pure Chemical Industries, Ltd.) were placed into a crucible made of platinum and having a diameter of 36 mm and a height of 40 mm. Further, as a flux, 19.111 g of NaCl (produced by Wako Pure Chemical Industries, Ltd.) was placed into the crucible. And, the solute and the flux were mixed in the crucible, and an opening of the crucible was covered by a lid lightly.

<2B> Next, the crucible was conveyed into an oven, heated up to 1,100° C. at a heating rate of 45° C./hour. The temperature (1,100° C.) is maintained for 10 hours. Thereafter, the crucible was cooled up to 500° C. at a cooling rate of 5° C./hour, conveyed outside the oven, and then cooled up to a room temperature. In this way, the monocrystalline material was obtained.

<3B> Next, the monocrystalline material was removed from the inside of the crucible. The monocrystalline material was subjected to a crystalline analysis using a X-ray diffraction by XRD-6000 (produced by Shimadzu Corporation). As a result, the obtained monocrystalline material was the sodium hexatitanate ($Na_2Ti_6O_{13}$).

Example 3

A solar cell was obtained in the same manner as in Example 1, except that the substrate was changed to a polycarbonate (PC) substrate having an average thickness of 100 μm, the facing substrate was changed to a PC substrate having an average thickness of 100 μm, the first electrode was changed to a ITO film having an average thickness of 1 μm, the second electrode was changed to a platinum film, and the heating temperature of the liquid coating was 120° C.

Example 4

A solar cell was obtained in the same manner as in Example 2, except that the substrate was changed to a PC substrate having an average thickness of 100 μm, the facing substrate was changed to a PC substrate having an average thickness of 100 μm, the first electrode was changed to a ITO film having an average thickness of 1 μm, the second electrode was changed to a platinum film, and the heating temperature of the liquid coating was 120° C.

Example 5

A solar cell was obtained in the same manner as in Example 3, except that the potassium hexaniobate ($K_4Nb_6O_{17}$) was changed to potassium octaniobate ($K_2Nb_8O_{21}$).

Example 6

A solar cell was obtained in the same manner as in Example 4, except that the sodium hexatitanate ($Na_2Ti_6O_{13}$) was changed to sodium trititanate ($Na_2Ti_3O_7$).

Example 7

A solar cell was obtained in the same manner as in Example 3, except that each of the substrate and the facing substrate was changed to a polyethylene terephthalate (PET) substrate.

Example 8

A solar cell was obtained in the same manner as in Example 4, except that each of the substrate and the facing substrate was changed to a polyethylene terephthalate (PET) substrate.

Example 9

A solar cell was obtained in the same manner as in Example 3, except that each of the substrate and the facing substrate was changed to a polyethylene naphthalate (PEN) substrate.

Example 10

A solar cell was obtained in the same manner as in Example 4, except that each of the substrate and the facing substrate was changed to a polyethylene naphthalate (PEN) substrate.

Example 11

A solar cell was obtained in the same manner as in Example 1, except that the electron transport layer was formed using particles of a monocrystalline material of potassium hexaniobate on and/or in which the dye was carried in advance as follows.

<1C> Next, the obtained monocrystalline material was ground using a mortar to obtain a powdery monocrystalline material (that is, particles of the monocrystalline material). In this regard, an average particle size of the particles was 15 μm. Subsequently, cis-bis(thiocyanato)-N,N-bis(2,2'-bipyridyl-4,4'-dicarboxylato) ruthenium(II) dihydrate (N719) was added into dried ethanol so that its concentration became $4 \times 10^{-4}$ mol % to thereby prepare a dye solution (a temperature thereof was 80° C.).

2 g of the obtained particles was added into 20 mL of the dye solution, and then the dye solution was stirred for 4 hours. In this way, the dye was carried on and/or in the particles of the monocrystalline material of potassium hexaniobate.

<2C> Next, the particles carrying the dye were added into a mixed solution prepared by mixing 25 mL of distilled water and 7.5 g of polyethylene glycol, and then the mixed solution was further stirred for 7 hours to thereby obtain a dispersion liquid in which the particles of the monocrystalline material of potassium hexaniobate were dispersed into the mixed solution.

<3C> Next, prepared was a glass substrate (substrate) having an average thickness of 1 mm and provided with a FTO film (first electrode) having an average thickness of 1 μm. Thereafter, the dispersion liquid obtained in the above step <2C> was applied onto the FTO film by a squeegee printing method to thereby obtain a liquid coating on the FTO film.

<4C> Next, the liquid coating was heated at 120° C. so that the dispersion medium was removed from the liquid coating to thereby obtain an electron transport layer having an average thickness of 25 μm.

Example 12

A solar cell was obtained in the same manner as in Example 11, except that the potassium hexaniobate ($K_4Nb_6O_{17}$) was changed to sodium hexatitanate ($Na_2Ti_6O_{13}$).

Example 13

A solar cell was obtained in the same manner as in Example 11, except that the substrate was changed to a PC substrate having an average thickness of 100 μm, the facing substrate was changed to a PC substrate having an average thickness of 100 μm, the first electrode was changed to a ITO film having an average thickness of 1 μm, and the second electrode was changed to a platinum film.

Example 14

A solar cell was obtained in the same manner as in Example 12, except that the substrate was changed to a PC substrate having an average thickness of 100 μm, the facing substrate was changed to a PC substrate having an average thickness of 100 μm, the first electrode was changed to a ITO film having an average thickness of 1 μm, and the second electrode was changed to a platinum film.

Comparative Example 1

A solar cell was obtained in the same manner as in Example 1, except that the electron transport layer was formed using particles of a polycrystalline material of titanium oxide as follows.

<1D> First, prepared were particles of the titanium oxide (anatase-type, produced by Wako Pure Chemical Industries, Ltd.) having an average particle size of 5 μm.

<2D> Next, 3 g of the particles was added into a mixed solution prepared by mixing 25 mL of distilled water and 7.5 g of polyethylene glycol with being stirred, and then the mixed solution was further stirred for 7 hours to thereby obtain a dispersion liquid in which the particles of the polycrystalline material of titanium oxide were dispersed into the mixed solution.

<3D> Next, prepared was a glass substrate (substrate) having an average thickness of 1 mm and provided with a FTO film (first electrode) having an average thickness of 1 μm.

<4D> Thereafter, the dispersion liquid obtained in the above step <2D> was applied onto the FTO film by a squeegee printing method to thereby obtain a liquid coating on the FTO film.

<5D> Next, the liquid coating was heated at 450° C. so that the dispersion medium was removed from the liquid coating and the particles were sintered to thereby obtain an electron transport layer having an average thickness of 5 μm.

Comparative Example 2

A solar cell was obtained in the same manner as in Comparative Example 1, except that the substrate was changed to a PC substrate having an average thickness of 100 μm, the facing substrate was changed to a PC substrate having an average thickness of 100 μm, the first electrode was changed to a ITO film having an average thickness of 1 μm, and the second electrode was changed to a platinum film.

2. Evaluation

For each of the solar cells manufactured by the Examples 1 to 14 and the Comparative Examples 1 and 2, an open-circuit voltage and a short-circuit current were measured using a I-V tester in a state that light was illuminated to each solar cell using a solar simulator under the condition of AM 1.5 (100 mW/cm$^2$).

Thereafter, based on the measured values of the open-voltage and the short-circuit current, and a photoelectric conversion efficiency of each solar cell was calculated.

In this regard, it is to be noted that the open-circuit voltage is a voltage which occurs between two electrodes of each solar cell in no connecting condition, and the short-circuit current is a current which flows through a circuit in a state that two electrodes of each solar cell are connected via the circuit.

Further, it is to be noted that the photoelectric conversion efficiency is a rate of an output electric energy to a light energy illuminated. These evaluation results are shown in the following Table 1. In this regard, it is to be noted that the measurement values of the Comparative Example 1 were used as reference values.

TABLE 1

| | Manufacturing condition of solar cell | | | | | Evaluation results | | |
|---|---|---|---|---|---|---|---|---|
| | | | Particles constituting electron transport layer | | | Open-circuit voltage (Relative value) | Short-circuit current (Relative value) | Photoelectric conversion efficiency (Relative value) |
| | Kind of substrate | Heating temperature [° C.] | Composition | | Average particle size [μm] | Method for carrying dye | | |
| Ex. 1 | Glass substrate | 450 | $K_4Nb_6O_{17}$ | Potassium hexaniobate | 15 | After heat-treatment | 1.3 | 1.3 | 1.3 |
| Ex. 2 | Glass substrate | 450 | $Na_2Ti_6O_{13}$ | Sodium hexatitanate | 15 | After heat-treatment | 1.3 | 1.3 | 1.3 |
| Ex. 3 | PC substrate | 120 | $K_4Nb_6O_{17}$ | potassium hexaniobate | 15 | After heat-treatment | 1.4 | 1.3 | 1.3 |
| Ex. 4 | PC substrate | 120 | $Na_2Ti_6O_{13}$ | Sodium hexatitanate | 15 | After heat-treatment | 1.2 | 1.2 | 1.2 |
| Ex. 5 | PC substrate | 120 | $K_2Nb_8O_{21}$ | Potassium octaniobate | 15 | After heat-treatment | 1.3 | 1.4 | 1.4 |
| Ex. 6 | PC substrate | 120 | $Na_2Ti_3O_7$ | Sodium trititanate | 15 | After heat-treatment | 1.3 | 1.3 | 1.3 |

TABLE 1-continued

| | | | Manufacturing condition of solar cell | | | | Evaluation results | | |
|---|---|---|---|---|---|---|---|---|---|
| | | | Particles constituting electron transport layer | | | | Open-circuit | Short-circuit | Photoelectric conversion |
| | Kind of substrate | Heating temperature [° C.] | Composition | | Average particle size [μm] | Method for carrying dye | voltage (Relative value) | current (Relative value) | efficiency (Relative value) |
| Ex. 7 | PET substrate | 120 | $K_4Nb_6O_{17}$ | Potassium hexaniobate | 15 | After heat-treatment | 1.4 | 1.3 | 1.3 |
| Ex. 8 | PET substrate | 120 | $Na_2Ti_6O_{13}$ | Sodium hexatitanate | 15 | After heat-treatment | 1.4 | 1.4 | 1.4 |
| Ex. 9 | PEN substrate | 120 | $K_4Nb_6O_{17}$ | Potassium hexaniobate | 15 | After heat-treatment | 1.4 | 1.4 | 1.4 |
| Ex. 10 | PEN substrate | 120 | $Na_2Ti_6O_{13}$ | Sodium hexatitanate | 15 | After heat-treatment | 1.4 | 1.4 | 1.4 |
| Ex. 11 | Glass substrate | 120 | $K_4Nb_6O_{17}$ | Potassium hexaniobate | 15 | Before heat-treatment | 1.3 | 1.3 | 1.3 |
| Ex. 12 | Glass substrate | 120 | $Na_2Ti_6O_{13}$ | Sodium hexatitanate | 15 | Before heat-treatment | 1.3 | 1.3 | 1.3 |
| Ex. 13 | PC substrate | 120 | $K_4Nb_6O_{17}$ | Potassium hexaniobate | 15 | Before heat-treatment | 1.2 | 1.2 | 1.2 |
| Ex. 14 | PC substrate | 120 | $Na_2Ti_6O_{13}$ | Sodium hexatitanate | 15 | Before heat-treatment | 1.2 | 1.2 | 1.2 |
| Comp. Ex. 1 | Glass substrate | 450 | $TiO_2$ | Titanium oxide | 5 | After heat-treatment | 1 | 1 | 1 |
| Comp. Ex. 2 | PC substrate | 450 | $TiO_2$ | Titanium oxide | 5 | After heat-treatment | — | — | — |

As seen from the results shown in the Table 1, all of the solar cells manufactured in the Examples 1 to 14 had a photoelectric conversion efficiency higher than that of the solar cell obtained in the Comparative Example 1. Further, in the Comparative Example 2, since the PC substrate was melted when the liquid coating was subjected to the heat-treatment, the open-circuit voltage and the short-circuit current of the solar cell could not be measured.

What is claimed is:

1. A photoelectric conversion device, comprising:
   a first electrode;
   a second electrode;
   an electron transport layer provided between the first electrode and the second electrode, and
   a dye layer provided between the first electrode and the second electrode
   wherein the electron transport layer includes a plurality of particles of sodium trititanate ($Na_2Ti_3O_7$) and each of the plurality of particles is a monocrystal whose crystal structure is a layer structure.

2. The photoelectric conversion device as claimed in claim 1, wherein the second electrode is arranged opposite to the first electrode, and the dye layer is provided in contact with the electron transport layer, and
   wherein the photoelectric conversion device further comprises an electrolyte layer provided in contact with the dye layer between the electron transport layer and the second electrode.

3. The photoelectric conversion device as claimed in claim 1, wherein the electron transport layer is constituted of an aggregate in which the particles are aggregated.

4. The photoelectric conversion device as claimed in claim 1, wherein an average particle size of the particles is in the range of 0.01 to 150 μm.

5. The photoelectric conversion device as claimed in claim 1, wherein an average thickness of the electron transport layer is in the range of 1 to 300 μm.

6. The photoelectric conversion device as claimed in claim 1, wherein the first electrode is constituted of a metal oxide material as a main component thereof.

7. The photoelectric conversion device as claimed in claim 1, wherein at least a part of the dye layer is penetrated into each of the plurality of particles.

8. Electronic equipment provided with the photoelectric conversion device defined in claim 1.

* * * * *